United States Patent
Hofrichter et al.

(10) Patent No.: US 8,875,311 B2
(45) Date of Patent: Oct. 28, 2014

(54) SCANNING PROBE MICROSCOPY CANTILEVER COMPRISING AN ELECTROMAGNETIC SENSOR

(75) Inventors: Jens Hofrichter, Gattikon (CH); Felix Holzner, Zurich (CH); Folkert Horst, Wettingen (CH); Philip Paul, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/570,666

(22) Filed: Aug. 9, 2012

(65) Prior Publication Data

US 2014/0047585 A1  Feb. 13, 2014

(51) Int. Cl.
  *G01Q 20/02* (2010.01)
  *G01Q 20/00* (2010.01)
  *G01Q 60/38* (2010.01)
  *G01Q 70/02* (2010.01)
  *G01Q 60/24* (2010.01)
  *G01Q 20/04* (2010.01)

(52) U.S. Cl.
  CPC ............ *G01Q 20/02* (2013.01); *G01Q 60/38* (2013.01); *G01Q 70/02* (2013.01); *G01Q 60/24* (2013.01); *G01Q 20/00* (2013.01); *G01Q 20/04* (2013.01)
  USPC .......................... 850/6; 850/1; 850/5; 850/7

(58) Field of Classification Search
  CPC ....... G01Q 20/02; G01Q 60/10; G01Q 60/24; G01Q 20/04; G01Q 20/00; G01Q 60/38; G01Q 70/02; G02B 2006/12159; G02B 2006/12138; G02B 6/3502; G02B 6/3566
  USPC .................................... 850/1, 5, 6, 7
  See application file for complete search history.

(56) References Cited

U.S. PATENT DOCUMENTS

| | | | | |
|---|---|---|---|---|
| 4,630,885 A | * | 12/1986 | Haavisto | 385/30 |
| 5,059,793 A | | 10/1991 | Miyamoto et al. | |
| 5,231,286 A | * | 7/1993 | Kajimura et al. | 250/234 |
| 5,329,271 A | | 7/1994 | Inuzuka et al. | |
| 5,354,985 A | * | 10/1994 | Quate | 250/234 |
| 5,546,375 A | | 8/1996 | Shimada et al. | |
| 5,936,237 A | * | 8/1999 | van der Weide | 250/234 |
| 6,157,448 A | * | 12/2000 | Kowa et al. | 356/365 |

(Continued)

FOREIGN PATENT DOCUMENTS

| | | |
|---|---|---|
| EP | 0509716 | 10/1992 |
| EP | 2477038 | 7/2012 |

(Continued)

OTHER PUBLICATIONS

Kiyat et al., "integrated micro ring resonator displacement sensor for scanning probe microscopies", J. Micromech. Microeng. 14 (2004) 374-381.*

(Continued)

*Primary Examiner* — Michael Logie
(74) *Attorney, Agent, or Firm* — Cantor Colburn LLP

(57) ABSTRACT

An apparatus and method directed to a scanning probe microscopy cantilever. The apparatus includes body and an electromagnetic sensor having a detectable electromagnetic property varying upon deformation of the body. The method includes scanning the surface of a material with the cantilever, such that the body of the cantilever undergoes deformations and detecting the electromagnetic property varying upon deformation of the body of the cantilever.

13 Claims, 3 Drawing Sheets

(56) References Cited

U.S. PATENT DOCUMENTS

| | | | |
|---|---|---|---|
| 6,721,053 B1* | 4/2004 | Maseeh | 356/436 |
| 6,992,777 B2* | 1/2006 | Han et al. | 356/491 |
| 7,265,429 B2 | 9/2007 | Wan et al. | |
| 7,385,749 B2 | 6/2008 | Pannell et al. | |
| 7,773,642 B2* | 8/2010 | Yamazaki | 372/20 |
| 2002/0172447 A1* | 11/2002 | MacDonald et al. | 385/13 |
| 2003/0123787 A1* | 7/2003 | Bona et al. | 385/17 |
| 2005/0180678 A1* | 8/2005 | Panepucci et al. | 385/13 |
| 2006/0227331 A1* | 10/2006 | Vollmer et al. | 356/483 |
| 2007/0186664 A1* | 8/2007 | Powlesland et al. | 73/777 |
| 2011/0303008 A1* | 12/2011 | Zhang et al. | 73/514.26 |
| 2012/0062974 A1* | 3/2012 | Manipatruni et al. | 359/238 |
| 2012/0269478 A1* | 10/2012 | Anderson et al. | 385/3 |
| 2012/0308181 A1* | 12/2012 | Hafezi et al. | 385/31 |
| 2013/0157882 A1* | 6/2013 | Quan et al. | 506/9 |

FOREIGN PATENT DOCUMENTS

| | | | | |
|---|---|---|---|---|
| JP | 04162340 | | 5/1992 | |
| JP | 10274659 | | 10/1998 | |
| WO | WO2004/112050 | | 12/2004 | |
| WO | WO 2004112050 A1 * | | 12/2004 | G12B 21/00 |

OTHER PUBLICATIONS

Scheuer et al., coupled Resonator Optical Waveguides (CROWs), Advanced Optical and Quantum Memories and Computing II, pp. 52-59, SPIE 2005.*

Y. Amemiya, Y. Tanushi, T. Tokunaga and S. Yokoyarna. "Photoelastic Effect in Silicon Ring Resonators" Japanese Journal of Applied Physics, 47(4). 2910-2914, (2008).

D. K. Biegelsen. "Photoelastic Tensor of Silicon and the Volume Dependence of the Average Gap" Physical Reviey Lellers, 32(21), 1196-1199. (1974).

D.K. Biegelsen. "Frequency dependence of the photoelastic coefficients of silicon" Physical Review B, 12(6), 2427-2431, (1975).

H Rho, H.E. Jackson and B .L. Weiss. "Mapping of local stress distributions in SiGe/Si optical channel waveguide"Journal of Applied Physics, 90, 276 (2001).

M. C. Brito, J. P. Pereira, J. Maia Alves. J. M. Serra and A.M. Vallera. "Measurement of residual stress in multicrystalline silicon ribbons by a self-calibrating infrared photoelastic method" Review of Scientific Instruments 76, 013901, (2005).

L. S. Yu, Z. F. Guan, Q. Z. Liu, and S. S. Lau. "Silicon on insulator photoelastic optical waveguide and polarizer", Applied Physics Letters 66(16), 2016, (1995).

M. Fukuzawa and M. Yamada. "Photoelastic characterization of Si wafers by scanning polariscope" Journal of Crystal Growth 229(1-4), 22-25, (2001).

F. Xia, L. Sekaric, M. O'Boyle and Y.A. Vlasov. "Coupled resonator optical waveguides based on silicon-on-insulator photonic wires". Applied Physics Letters 89, 041122 (2006).

H. Kawakatsu, S. Kawai, D. Saya, M. Nagashio, D. Kobayashi, H. Toshiyoshi, and H. Fujita. "Towards atomic force microscopy up to 100 MHz", Rev. Sci. Instrum. 73, 2317 (2002).

G. Schitter, M. J. Rost. "Scanning probe microscopy at vide-rate", Materials Today 11 (specal issue): 40-48 (2008).

K. Srinivasan, H. Miao, M. Rakher, M. Davano, and V. Aksyuk: "Optomechanical Transduction of an Integrated Silicon Cantilever Probe Using a Microdisk Resonator", Nano Lett.

B. E. A. Saieh and M. C. Teich: "Fundamentals of Photonics", Wiley, 2007.

M. Despont, U. Drechsler, R. Yu, H. B. Pogge and P. Vettiger, "Wafer-scale Microdevice Transfer/Interconnect: Its Application in an AFM-Based Data Storage System", Journal of Microelectromechanical Systems 13(6), pp. 895-901, 2004.

H. Rothuizen, M. Despont, U. Drechsler, C. Hagleitner, A. Sebastian and D. Wiesmann, ,Design of Power-Optimized Thermal Cantilevers For Scanning Probe Topography Sensing, 22nd International Conference on Micro Electro Mechanical Systems (MEMS), Sorrento, Jan. 2009, pp. 603-606, (2009).

Hayashi, T., Tachiki, M., Itozaki, H., "SQUID proobe microscope combined with scanning tunneling microscope", Applied Superconductivity, IEEE Transactions on vol. 17, Issue 2, Jun. 2007 pp. 792-795.

* cited by examiner

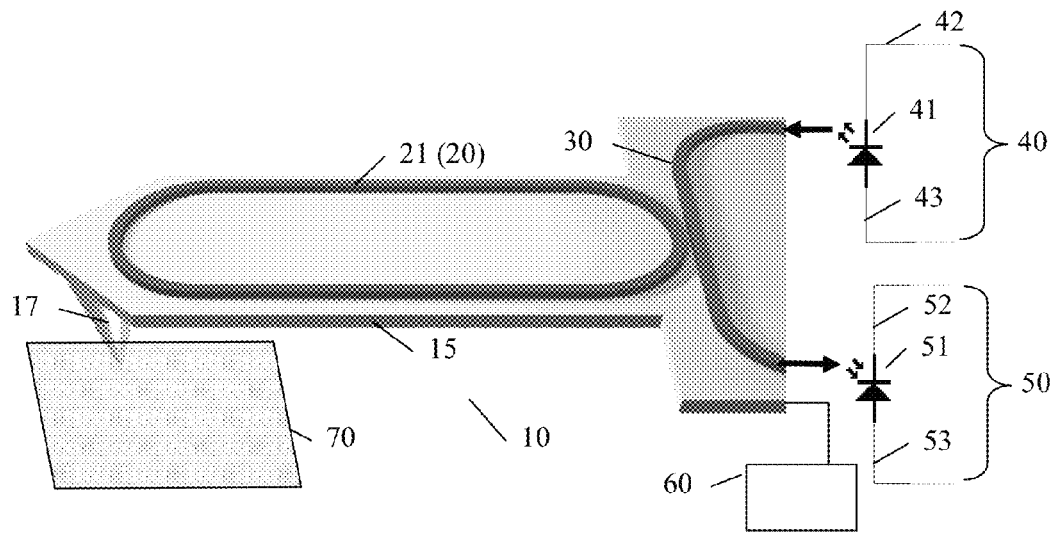
FIG. 1.A
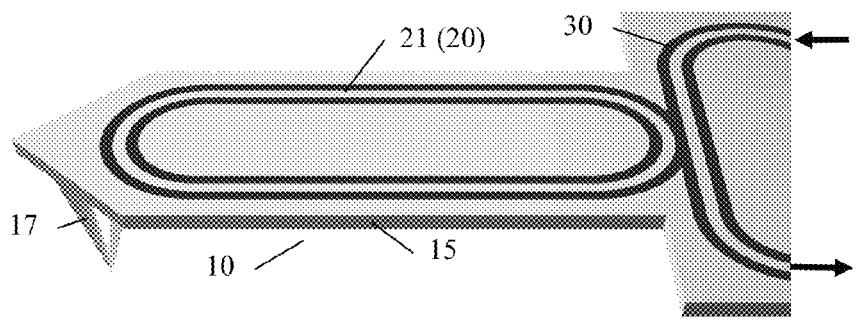
FIG. 1.B
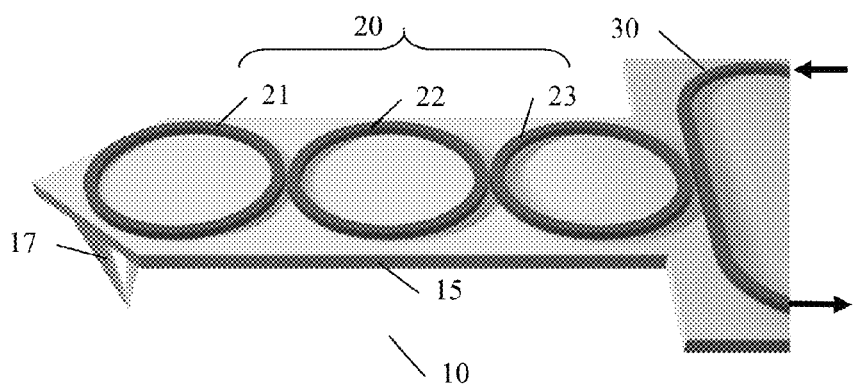
FIG. 2.

US 8,875,311 B2

SCANNING PROBE MICROSCOPY CANTILEVER COMPRISING AN ELECTROMAGNETIC SENSOR

CROSS-REFERENCE TO RELATED APPLICATION

This application claims priority under 35 U.S.C. §119 from European Patent Application No. 11177264.6 filed Aug. 11, 2011, the entire contents of which are incorporated herein by reference.

BACKGROUND OF THE INVENTION

1. Field of the Invention

The invention relates to the field of scanning probe microscopy cantilevers and read-out schemes for detecting and monitoring movements of the cantilevers when the latter is operated above the surface of a material.

2. Description of Related Art

Scanning probe microscopy (SPM) implements scanning tunneling and the atomic force microscope. It aims to form images of sample surfaces using a physical probe. Scanning probe microscopy techniques rely on scanning such a probe, e.g. a sharp tip, just above or in contact with a sample surface whilst monitoring interaction between the probe and the surface. An image of the sample surface can thereby be obtained. Typically, a raster scan of the sample is carried out and the probe-surface interaction is recorded as a function of position. Data are typically obtained as a two-dimensional grid of data points.

The resolution achieved varies with the underlying technique. Atomic resolution can be achieved in some cases. Typically, either piezoelectric actuators or electrostatic actuation are used to execute precise motions of the probe.

Two main types of SPM are the scanning tunneling microscopy (STM) and the atomic force microscopy (AFM). The invention of STM was quickly followed by the development of a family of related techniques (including AFM), which together with STM form the SPM techniques. As known, the interaction monitored in STM is the current tunneling between a metallic tip and a conducting substrate. The quantum mechanical concept of tunneling allows for electrons to tunnel through a potential barrier, which they cannot surmount according to the paradigm of classical physics. Thus, in the quantum world, electrons are able to hop through the classically-forbidden space between the tip and the sample.

Using STM, imaging of the surface topology is usually carried out in one of two modes: (i) in constant height mode, wherein the tunnel current is monitored as the tip is moved parallel to the surface); and (ii) in constant current mode, wherein the tunnel current is maintained constant as the tip is scanned across the surface and a deflection of the tip is measured.

In AFM techniques, forces between the tip and the surface are monitored. This can be either the short range Pauli repulsive force (in contact-mode) or the longer range attractive force (in non-contact mode, merely van der Waals forces).

Using AFM techniques, imaging of the surface topology is usually carried out in one of three modes: (i) in contact mode, where the probe is moved over the surface with constant contact thus monitoring the surface by changing the height set-point; and (ii) in non-contact mode, where a stiff cantilever oscillates with a small amplitude of typically less than 10 nm above the surface. Influences of the surface lead to changes in frequency and amplitude of the cantilever. These changes can be detected and used as the feedback signals. In a third mode, (iii) the intermittent contact or tapping mode, the cantilever is oscillated with larger amplitude of typically 100 to 200 nm. Short range forces are detectable without sticking of the cantilever to the surface.

The above techniques are translated into topography by a sensor. A common type of sensor is a bulk-component-based free-space laser beam deflection setup with a four quadrant photo diode acting as the deflection sensor. Other known principles include thermal height sensing and piezoresistive deflection sensors.

In both STM and AFM, the position of the tip with respect to the surface must be accurately controlled (e.g., to within about 0.1 Å) by moving either the sample or the tip. The tip is usually very sharp; ideally terminated by a single atom or molecule at its closest point to the surface.

Metallic probe tips for conductive measurements are typically made of platinum/iridium or gold. In this respect, two main methods for obtaining a sharp probe tip are known: acid etching and cutting. The first method involves dipping a wire end first into an acid bath and waiting until it has etched through the wire and the lower part drops away. The resulting tip can thus often be one atom in diameter at its end. An alternative and quicker method is to take a thin wire and cut it with convenient tools. Testing the tip produced via this method on a sample with a known profile will then indicate whether the tip is suitable or not.

Silicon probe tips as typically used for non-conductive AFM measurements are typically made by isotropically etching a silicon pillar structure until the required sharpness is reached.

For the sake of exemplification, U.S. Pat. No. 5,059,793 (A) provides a scanning type tunnel microscope in which a servo system for controlling the distance between the probe and the sample can be set in a proper condition irrespective of the surface condition of the sample. As another example, U.S. Pat. No. 5,546,375 (A) provides a method for manufacturing a fine tip for detecting a fine current or force.

A number of publications are directed to STM and the manufacture of SPM probes, see e.g., Hayashi, T., Tachiki, M., Itozaki, H., Applied Superconductivity, IEEE Transactions on Volume 17, Issue 2, June 2007 Page(s): 792-795 (DOI 10.1109/TASC.2007.898557).

In other technical fields, one also knows optical waveguides, ring resonators, isolators, and other optical components which are basic building blocks for a number of integrated photonic components, such as switches, lasers, filters and sensors. Optical ring resonators comprise a waveguide in a closed loop, typically coupled to input/output waveguides. Light having an appropriate wavelength can be coupled to the loop via the input waveguide, to build up in intensity over multiple round-trips, owing to constructive interference. Light can then be picked up via an output waveguide. Also, since a determined set of wavelengths resonate in the loop, the resonator can be used as a filter.

SUMMARY OF THE INVENTION

In one aspect, the present invention is embodied as a scanning probe microscopy cantilever, comprising a cantilever body and an electromagnetic sensor coupled to the body, the sensor having a detectable electromagnetic property varying upon deformation of the body.

In another aspect of the invention, a detection method using a cantilever body and an electromagnetic sensor coupled to the body, wherein the sensor has a detectable electromagnetic property varying upon deformation of the body. The method includes scanning the surface of a material with the cantilever, such that the body of the cantilever undergoes deformations and detecting the electromagnetic property varying upon deformation of the body of the cantilever.

Cantilevers and other devices, as well as detection methods embodying the present invention will now be described, by way of non-limiting examples, and in reference to the accompanying drawings.

BRIEF DESCRIPTION OF THE DRAWINGS

FIG. 1 schematically depicts a SPM apparatus with an optical read-out sensor integrated to an SPM cantilever, according to embodiments of the present invention. FIG. 1.A corresponds to an on-top configuration of the sensor. FIG. 1.B depicts an in-plane configuration, with the sensor structured within a thickness of a surface of the cantilever body;

FIG. 2 shows a variant to FIG. 1.A;

DETAILED DESCRIPTION OF THE PREFERRED EMBODIMENTS

Figure 3:
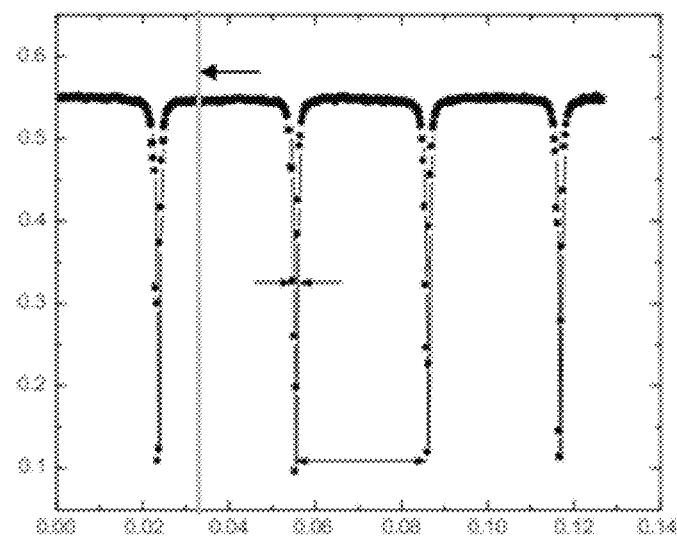
FIGS. 3-4 exhibit typical transmission spectra, as obtained with apparatuses such as that of FIG. 1, respectively with an unstrained and a strained cantilever.

As an introduction to the following description, it is first pointed at general aspects of the invention, reflecting in each of the embodiments of FIGS. 1-2. In each case, a scanning probe microscopy (or SPM) cantilever 10 is provided, which includes a body 15, e.g., terminated by a probe tip 17 as usual. The cantilever further includes an electromagnetic sensor 20, coupled to the body. The sensor has an electromagnetic property (e.g., index of refraction), which varies upon deformation of the body of the cantilever. Thus, mechanical strain induced in the body when operating the cantilever above a sample surface 70 will modulate the electromagnetic property of the sensor. This property can then be detected by a convenient set-up 40-50, thereby providing an electromagnetic detection system for the SPM cantilever. The height of the cantilever can accordingly be measured.

Many types of electromagnetic devices can be contemplated for use as a sensor 20 as described above, i.e., devices having an electromagnetic property varying upon deformation. The sensor is easily manufactured as one or more waveguides 21, 22, 23 arranged at the body. The waveguides can for instance be provided within the bulk of the body 15, e.g., structured within a limited thickness at the surface of the body or made flush with a surface thereof. They can also be provided on top of a surface of the body, e.g., protruding from the surface. The waveguides 21, 22, 23 are racetrack resonators (i.e., arranged in a closed loop). Disk shapes can be contemplated, depending on the manufacture process used and other constraints.

The cantilever can further include one or more additional waveguides 30 arranged on the body, e.g., in the vicinity of the sensor 20 such as to be able to easily inject and pick-up light from the sensor 20, as known from optical resonators. These additional waveguides can be considered to form part of the sensor. The sensor 20 includes one or more core elements 21-23, having an optical property varying upon deformation (e.g., stress, strain or the like) and that this sensor is possibly coupled to input/output elements 30.

In a simple case, the sensor includes a single resonator, e.g., a race track resonator 21 (FIG. 1). In variants, it can include two or more resonators, each impacting the detected property. They are for instance configured as a coupled resonator optical waveguide (CROW).

All such variants shall be discussed in more details below, which allow for an integrated instead of bulk-component-based optical deflection and height detection system. The resulting read-out scheme is electromagnetic-based and essentially free of electrical cross-talk. This gives rise to various advanced, high resolution read-out schemes, e.g. for massively parallel, very small cantilevers or space-constrained systems where free-space bulk-component-based optical sensing is infeasible. In addition, the read-out speeds obtained are limited by the mechanical properties of the cantilever instead of the time constant of other sensing systems (e.g. thermal time constant for thermal sensing, or the time constant of a piezoresistive read-out scheme), whereby high-speed operation can be contemplated. Embodiments described below are integrable with cantilevers used for writing applications.

Nano-patterning and metrology systems are known which today allow for patterning pixel rates of 500 kHz at 20 mm/s to be achieved. However, the metrology function of such systems is limited by the thermal time constant of the thermo-electric read-back sensor. While the read rate remains acceptable, it is limited to below 100 kHz in a number of practical applications.

The next generation of cantilevers are expected to further widen the speed gap, as the cantilever thermal time constant should not decrease as much as the mechanical resonance frequency increases. Current thermo-electric imaging methods lose sensitivity when long tips are used, for some applications. Since the cantilever is electrostatically actuated, there is significant cross-talk between cantilever actuation and read-out signals. While this is not an issue during contact mode reading, this prevents from carrying out simultaneous readback and closed-loop control of the cantilever while writing patterns. In addition, the size of the new generation cantilevers, as well as the proposed form factors and parallelization make it infeasible to consider free-space optical readout systems.

Commercial AFMs typically read the topography optically. A laser is focused onto the cantilever, and a four-quadrant photodiode measures the light reflected off the cantilever. The cantilever is brought into contact with the sample. Depending on the topography, the deflection of the cantilever varies, resulting in a modulation of the angle of the cantilever with respect to the read-out optics, thus modulating the signal of the photodiode. This imaging method is faster than thermal imaging: pixel rates of 100 MHz as well as video-rate acquisition of entire images have been demonstrated. Cantilevers have also been successfully combined with optical reading. However, some problems can be anticipated when willing to integrate optical read into fast AFM setups:

(a) Cantilever Size

The new generation of cantilevers will have a significantly smaller size, thus reducing the amount of reflected light compared to the amount of light reflected off the sample.

(b) Mechanics

In contrast to the patterning setups used to date, future fast scanning setups can not necessarily have a fixed cantilever. If both cantilever and sample are actuated, the optical readout system can also have to be placed on the motion stages, reducing the achievable scan speed. An additional actuated laser tower will act as an acoustic antenna and introduce or increase vibrations, reducing the achievable accuracy for a given scan speed.

(c) Backside Electrode

A further possible addition to an AFM-based patterning system is the introduction of a dedicated actuation electrode on the back of the cantilever. This allows a retractive force to be applied to the cantilever as well. Accelerating the cantilever retraction is regarded as a key component of fast patterning above the resonance frequency, which so far was not possible to accurately control. It can be realized that providing a dedicated plate of silicon above the cantilever to that effect cannot be compatible with standard laser readout methods.

In contrast, embodiments discussed herein allow metrology to be carried out at the speed determined by the mechanical properties of the cantilever without otherwise suffering from the above limitations. As to be discussed later in details, the optical bandwidth can be estimated to be 125 GHz in some cases. It does thus not at all limit the overall speed limitation of the device.

The present invention uses an (e.g., in-plane) waveguide-based optical read-out scheme. Unlike an electrical read-out scheme, the proposed schemes are essentially insensitive to electrical and magnetic interferences. Also, unlike laser reflection schemes, they are compatible with modifications currently planned for cantilevers of the next generation, as evoked above.

The purpose of the invention is to couple an electromagnetic sensor to the cantilever's body, e.g., integrate an optical resonator on top of or in plane with the cantilever. Upon approaching the surface, the cantilever is deformed, which in turn induces strain both in the cantilever body and in the optical resonator. The strain then alters the optical properties of the resonator (e.g. index of refraction) which then can be read out optically. Parameters taken from publications in the field indicate that nanometer resolution is achievable with such a structure.

For example, each of FIGS. 1.A and 1.B shows an AFM cantilever 10 having an integrated optical read-out sensor 20, which in this example restrict to a single resonator 21 coupled to a waveguide 30. FIG. 1.A corresponds to an on-top configuration of the sensor 20. FIG. 1.B corresponds to an in-plane configuration. The depicted cantilevers can include additional elements, e.g., electrically-driven heating elements for writing applications, micro-machined $SiO_2$ straps, blankets, membranes, etc., which are however not depicted, for simplicity.

The integrated optical resonator can for instance be fabricated in silicon-on-insulator (SOI) technology. For example, a race-track resonator 21 is formed on the back-side of the cantilever's body 15 (on-top configuration, FIG. 1.A). The resonator 21 is coupled to the waveguide 30, which allows for injecting and detecting light. On the top-right side, a light source element (light-emitting diode [LED], Laser, etc) 41 is provided, which can be coupled to the waveguide 30 using known techniques. Conversely, a light detector element 51 is coupled to the waveguide 30 on the bottom-right port. The light source and detector elements 41, 51 are coupled to any suitable circuitry 42, 43, 52, 53 to form working light source 40 and detector 50, as known per se.

In reference to FIG. 1.B, the in-plane configuration, the sensor 20 (waveguide 21) is here structured within a thickness of the back surface of the body. This is for instance achieved by grooving the surface such as to "draw" the waveguides 21 (and waveguide 30), as to be described in details later. Features 40-70 as depicted in FIG. 1.A are not repeated here, for conciseness. However, the general operation principle remains essentially the same.

Figure 4:
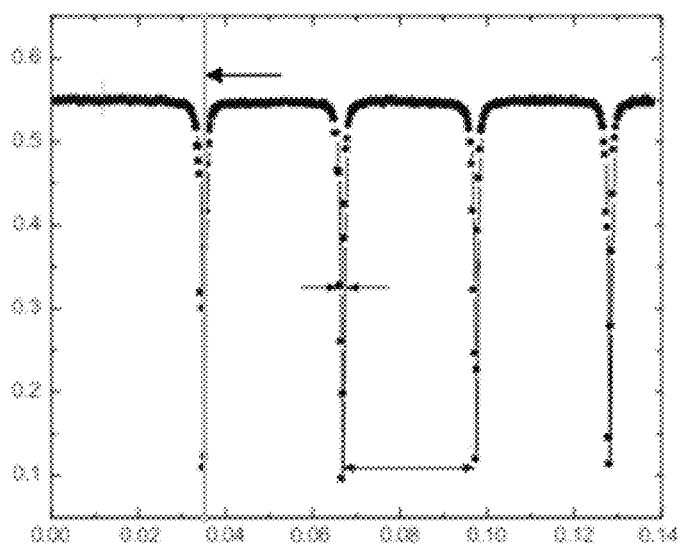

When no stress is applied to the cantilever, the race-track resonator exhibits a transmission spectrum such as depicted in FIG. 3. Shining in light 41 from the top port at maximum transmission leads to a current signal in the light detector 50. Upon deformation of the body 15, the transmission spectrum shifts, as seen in FIG. 4. FIGS. 3 and 4 show transmission spectra, i.e., the transmission (arbitrary units) vs. wavelength tuning (nanometers or nm). When a zero of the transmission spectrum matches the laser wavelength (represented as a vertical line), as seen in FIG. 4, essentially no signal shall be obtained at the detector 50, e.g., a "zero" in a photo diode signal.

It can be realized that information as to the height of the substrate and thus a deformation of the cantilever can be encoded in a digital fashion in the optical domain. The height information corresponds to the amount of intensity changes, which a photodiode detects. Atomic resolution can for instance be achieved by designing a high quality factor (High-Q) resonator having Q-values in the order of 100.000, which is possible using, e.g., silicon-on-insulator (SOI) technology, also commonly referred to as silicon photonics.

Besides a shift in the transmission spectrum, other detection schemes can be contemplated. For example the polarization rotation of light can be detected using the material's birefringence. Preferably, detection uses polarization rotation.

Next, other sensor (e.g., waveguide) structures can be contemplated. For example, structures such as a Mach-Zehnder interferometer having one arm experiencing strain and one unstrained arm can be fabricated. However, such structures rely on the same basic idea: the sensor 20 has a detectable electromagnetic (optical) property varying upon deformation of the cantilever's body.

More generally, many detection apparatuses and schemes can be contemplated (also according to embodiments of this invention), which are able to detect a property of the sensor that varies upon deformation of the body 15 of the cantilever, when the latter is scanned above a sample surface. As said, the detection scheme can be based on the transmission spectrum or the birefringence of the sensor's material. Advantageously, it can be realized that present embodiments allow for simultaneous readback and closed-loop control of the cantilever while writing patterns.

Moreover, the present invention can also be embodied as a scanning probe microscope (e.g., an AFM or STM microscope) or essential components thereof, i.e., including a cantilever and/or a detection set-up such as described above. In a complete configuration, such a scanning probe microscope can typically include a cantilever 10, an actuation mechanism and a feedback loop circuitry 60, including a proper detection/monitoring system 40-50, as symbolically depicted in FIGS. 1-2.

Referring back to FIG. 1, and as discussed earlier, suitable sensors can be embodied as one or more silicon waveguides 21, whose optical properties are altered by strain, e.g., on top of (FIG. 1.A) or in plane with (FIG. 1.B) the cantilever's body. The height information is obtained by the detection of the optical signal propagating through the strained waveguide.

Alternatively, and as depicted in FIG. 2, a coupled resonator optical waveguide (CROW) 21-23 can be implemented—either instead or additionally to the race track resonator 21, for improving resolution. In reference to FIG. 2 (again, features 40-70 as depicted in FIG. 1.A are not repeated here, for conciseness), coupling resonators 21-23 in a CROW allows for precise control of the transmission and/or filter spectrum. Besides flat passband filters also filters with arbitrarily shaped slopes can be designed. Instead of a flat passband filter a slanted sidewall filter can be designed for ultra high precision height control. The first order derivation of such a filter delivers information about whether the cantilever approaches surface or is removed from the surface.

Figure 5:
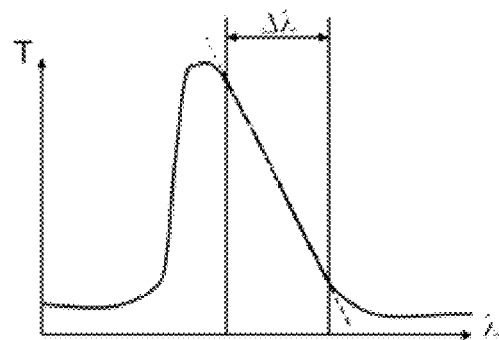
FIGS. 5-6 respectively show a transmission spectrum and a stop band spectrum of a coupled resonator optical waveguide (CROW) for ultra high resolution imaging, as obtainable with an apparatus as depicted in FIG. 2.
Figure 6:
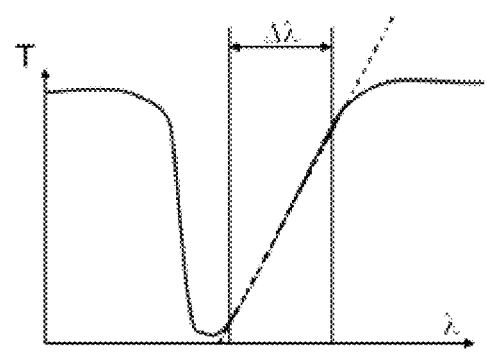

FIGS. 5 and 6 show corresponding transmission spectra. FIG. 5 corresponds to a CROW structure in transmission and FIG. 6 to a CROW structure as filter. Note that the wavelength range $\Delta\lambda$ can be designed such that a large change in the transmission T can be achieved. This means that very small height deviations can be sensed since only a little change in resonance wavelength is needed to achieve a large change in the transmission.

Example calculation:

When designing the resonator as a race track resonator in silicon, the photoelastic coefficient in silicon results in approx. 0.1 nm shift for a strain of $\sigma=1\times10^{-4}$. Bending the cantilever having a length of 65 micron about 180 nm results in a strain value of $\sigma=3\times10^{-3}$. This translates to a shift of about 15 pm in wavelength per nm surface height deviation. The corresponding ring resonator thus needs to have a quality factor Q of $$Q \approx \frac{\lambda_0}{\Delta\lambda} = \frac{1550 \text{ nm}}{0.015 \text{ nm}} \approx 100\,000.$$

The speed limitation of the optical device is determined by its cavity decay time $\tau_p$. The resonance frequency is:

$$v = \frac{c}{\lambda} = \frac{3 \cdot 10^8 \text{ ms}^{-1}}{1550 \cdot 10^{-9} \text{ m}} = 193.5 \text{ THz}.$$

Next, the quality factor is defined as:

$$Q = 2\pi v \tau_p.$$

Thus, the photon lifetime $\tau_p$ is $$\tau_p = \frac{Q}{2\pi v} = \frac{10^5 \text{ ms}^{-1}}{2\pi \cdot 193.5 \cdot 10^{12} \text{s}^{-1}} \approx 8 \text{ ps}.$$

This means the optical limit of the device speed is 125 GHz in this example. Therefore, one understands that the operation speed of the device shall be limited by the mechanical properties of the cantilever and not by the optical limits. The sensor preferably includes at least one waveguide having a quality factor Q larger than 10 000 (which already appears satisfactory for many applications in practice), and more preferably on the order of or larger than 100 000.

Typically, the waveguides are made of silicon, grown on top of the cantilever, using known processes. Fabricating such a device can for instance make use of the known silicon-on-insulator (or SOI) technique. One can also integrate the race track in plane with the cantilever, i.e. have an arch with the tip and tip heater, and the race track passing in the middle of the arch.

Typically, the waveguides are made of silicon, as is the cantilever, using known processes. As evoked above, the waveguide can be placed in plane of the cantilever, or on top of it. In-plane silicon waveguides can be fabricated using the same process as for the cantilever, as described in more details below. Next, fabricating a waveguide on top of the cantilever requires additional fabrication steps, which essentially amount to the deposition of a waveguide on top of a substrate, i.e., the cantilever.

In embodiments, the waveguides are single mode waveguides. For a silicon-on-insulator (SOI) substrate, such waveguides are typically smaller than $1\times1$ $\mu m^2$. The size of the waveguide is preferably smaller than $300\times600$ $nm^2$, more preferably about $220\times550$ $nm^2$.

Also, the light 41 from the light source 40 can be coupled using tapers (lateral coupling) or grating couplers (vertical coupling) to the cantilever 15, and the input waveguide 30, respectively. Alternatively, cleaved-edge coupling can be employed for lateral coupling. Furthermore, micro lens arrays or mirrors can be used for coupling.

The fabrication of the cantilever body 15, including the optical sensing unit 21, can proceed with known processes. First, a SOI wafer with a 2 micron epitaxially grown silicon membrane is oxidized. Then, the oxide mask is etched open by reactive ion etching (RIE) using a $CHF_3/O_2$-based chemistry. Subsequently, an isotropic $SF_6/Ar$ RIE plasma is used to etch an hourglass-shaped precursor of the tip into the membrane. After oxide hard mask removal, an oxidation sharpening technique is used to finalize the tip shape. Then, the oxide is removed wet-chemically and the remaining silicon membrane is tinned using conventional lithography and $SF_6$-based RIE. The electrical contacts and resistive areas are formed by sequential capping using thermal oxide, implantation and dopant activation.

The cantilever including the optical sensing area 21 are then transferred into the remaining Si membrane using RIE and the underlying $SiO_2$ as etch stop layer. After finalization of the cantilever front-size using liftoff technique to form the electrical contacts, the transfer as well as the back-side processing follows known processes. An approximately 5 micron polyimide (PI) layer is spun on top of the pre-fabricated cantilevers and cured, followed by lamination of the wafer to a glass substrate.

Then, the SOI handle wafer is removed by grinding and $SF_6$-based plasma etching to remove the remaining silicon part again using the buried oxide (BOX) as the etch stop layer. During the back-side processing the silicon oxide and/or silicon nitride straps are defined. Next, the new handle wafer is coated with an adhesive and bonding is performed to the glass wafer. The chip body is structured using deep RIE. Finally, the cantilever is released from the adhesive using oxygen plasma etch. In other words, using a fabrication technique such as described above allows for achieving an electromagnetic sensor 20 structured within a thickness of the surface of the body (i.e., in-plane configuration). In the example above, the material used for the sensor is the same as that used for the body.

Yet, other fabrication techniques can be contemplated, e.g., for achieving an electromagnetic sensor 20 structured within the surface thickness of the body, wherein the material used for the sensor differs from that used for the body, e.g., for applications in the visible spectrum.

More generally, the sensor includes one or more waveguides 21, 22, 23 arranged at the body, which waveguides can be structured within the surface thickness, as discussed above, or deposited on top of the cantilever body 15. Similarly, for on-top configurations, the material used for the sensor can differ from that used for the body (again, for applications such as in the visible spectrum).

Then, concerning the light sources that can be used to couple into the waveguides: a suitable light source can be a commercial fiber-coupled laser diode or a vertical cavity surface emitting laser (VCSEL). Also, certain types of light emitting diodes (LEDs) can be employed. Besides fiber pig-tailed components also integrated laser sources, such as strained germanium (Ge) laser diodes or erbium (Er) doped laser diodes can be used. Furthermore, the light source can include heterogeneously integrated light sources, such as VCSELs or microdisc laser mounted on top of the cantilever.

Next, the detector unit 50 can consist of a conventional InGaAs photodiode or a silicon photodiode or further commercially available photodiodes. Besides fiber pig-tailed solutions, also integrated photodiodes can be used, such as SiGe avalanche photo diodes.

When using a broad-band light source as light source 40, such as LEDs, the detecting unit 50 can include a band-pass filter to spectrally separate the light that is being manipulated in the strained waveguide 20 with respect to the transmitted light thought the waveguide 30.

Suitable materials for the waveguides include elements or compounds derived from semiconductors such as Si, $Si_3N_4$, $SiO_2$, Polymers, GaAs, AlAs, GaN, InP, InGaAsP, InAlAs, InGaAlAs, $Ta_2O_5$, $TiO_2$ or InGaN, etc.

Also, as seen in FIGS. 1-2, the resonator 21, 22, 23 typically has a disk or ring shape. Although generally circular shapes are preferred, the waveguide sensor can have an elliptical or convex shape. Ring-shapes can be advantageous for some applications because of constraints on placement. Preferably, the body and the waveguide sensor are single-piece, e.g., in case of in-plane configurations.

To conclude, devices and methods simplifying and improving the read-out capabilities of SPM cantilevers have been disclosed. For instance, while previous integrated sensor solutions, as advantageous for e.g. small and high resonance frequency cantilevers or massively multiplexed cantilever arrays rely on changes in electrical characteristics are prone to interference and noise as well as slow time constants, novel methods of reading out the signal optically were presented. Instead of resistance modulation, the modulation of the optical properties of the cantilever is relied upon.

Most practically, it is proposed to form waveguides on top of or in plane with state-of-the-art cantilevers, whose material exhibit a change of optical properties with mechanical strain. Structures have been disclosed, which include one or more rings or racetrack resonators with one ore more attached waveguides for inputting and outputting light into the structure. In contrast to known processes, the resulting read-out scheme is optical and thus free of electrical cross-talk. The fabrication of the device is complementary metal oxide semiconductor (CMOS) compatible and can be performed in the same steps when the cantilever arm is formed, lending itself for low-cost mass fabrication.

While the present invention has been described with reference to certain embodiments, it will be understood by those skilled in the art that various changes can be made and equivalents can be substituted without departing from the scope of the present invention. In addition, many modifications can be made to adapt a particular situation to the teachings of the present invention without departing from its scope. Therefore, it is intended that the present invention not be limited to the particular embodiment disclosed, but that the present invention will include all embodiments falling within the scope of the appended claims. For instance, other materials than those evoked above can be used. Also, other resonator shape, placement, and configuration can be contemplated.

We claim:

1. A scanning probe microscopy cantilever, comprising:
   a cantilever body; and
   an electromagnetic sensor coupled to the cantilever body, the electromagnetic sensor having at least two coupled resonator waveguides forming a coupled resonator optical waveguide and having a detectable electromagnetic property that varies with deformation and that produces a slanted transmission spectrum over a range of wavelengths;
   wherein a change in the transmission of light through the electromagnetic sensor is indicative of the deformation of the cantilever body.

2. The cantilever of claim 1, wherein the electromagnetic sensor is arranged at the cantilever body at one of: (i) on a surface of the cantilever body; and (ii) within a thickness of a surface of the cantilever body.

3. The cantilever of claim 2, wherein said at least two waveguides are in a closed loop.

4. The cantilever of claim 2, wherein the sensor comprises at least one waveguide arranged at the body by way of silicon-on-insulator technology.

5. The cantilever of claim 2, wherein the sensor comprises at least one waveguide having a quality factor larger than 10,000, preferably larger than 100,000.

6. The cantilever of claim 1, further comprising one or more additional waveguides optically coupled to the electromagnetic sensor to perform at least one of: (i) inputting an electromagnetic wave into the sensor; and (ii) detecting an electromagnetic wave from the sensor.

7. The cantilever of claim 1, wherein the sensor is configured as a Mach-Zehnder interferometer.

8. A detection apparatus configured to detect the electromagnetic property varying upon deformation of the body of the scanning probe microscopy cantilever according to claim 1.

9. A scanning probe microscope comprising one or more devices according to claim 1.

10. A method of detecting a material, comprising:
    providing a cantilever proximate a surface of the material, the cantilever having a body with an electromagnetic sensor coupled thereto, the electromagnetic sensor having at least two coupled resonator waveguides forming a coupled resonator optical waveguide and having a detectable electromagnetic property that varies with deformation and that produces a slanted transmission spectrum over a range of wavelengths;
    scanning the surface of a material with the cantilever, such that the body of the cantilever undergoes a deformation; and
    determining the deformation of the cantilever from a change in the transmission of light through the electromagnetic sensor to detect the material.

11. The method of claim 10, wherein detecting the variation in the electromagnetic property further comprises detecting a transmission spectrum at the sensor.

12. The method of claim 10, wherein detecting the variation in the electromagnetic property further comprises detecting a birefringence of a material of the sensor.

13. The method of claim 10, wherein detecting the variation in the electromagnetic property further comprises detecting a polarization rotation.

* * * * *